United States Patent [19]

Toibana et al.

[11] Patent Number: 5,061,597

[45] Date of Patent: Oct. 29, 1991

[54] OPTICAL RECORDING MEDIA AND PROCESS FOR PREPARING SAME

[75] Inventors: Hisaharu Toibana; Mitsuyuki Kuroiwa; Akira Todo; Takeshi Minoda, all of Chiba, Japan

[73] Assignee: Mitsui Petrochemical Industries, Inc., Tokyo, Japan

[21] Appl. No.: 566,039

[22] Filed: Aug. 13, 1990

Related U.S. Application Data

[63] Continuation-in-part of Ser. No. 340,085, Apr. 18, 1989, abandoned.

[51] Int. Cl.$^5$ ............................ G03C 1/72; G11B 7/24
[52] U.S. Cl. .................................... 430/270; 430/271; 430/272; 430/275; 430/495; 430/945; 346/135.1
[58] Field of Search ............... 430/270, 271, 272, 275, 430/290, 346, 495, 945, 964; 346/135.1

[56] References Cited

U.S. PATENT DOCUMENTS 4,929,485 5/1990 Ohkawa et al. ...................... 430/495
4,981,777 1/1991 Kuriowa et al. ..................... 430/270

OTHER PUBLICATIONS

CRC Handbook of Chemistry and Physics, 63rd Edition, backcover pages.

JPA 59-63038, Translation, Optical Recording Medium, Goto et al., 1984.

*Primary Examiner*—Charles L. Bowers, Jr.
*Assistant Examiner*—Lee C. Wright
*Attorney, Agent, or Firm*—Nixon & Vanderhye

[57] ABSTRACT

The optical recording media disclosed herein comprises a substrate and a recording layer formed thereon, wherein the recording layer is irradiated with beam of energy to form thereon bits corresponding to given pieces of information and thereby record the pieces of information. The recording layer comprises Te, Cr, C and H, the proportion of Cr contained in said recording layer, based on all atoms constituting the recording layer, is 0.1–40 atom % and that of C contained in said recording layer is 0.1–40 atom %. In another aspect, the proportion of Cr contained in said recording layer, based on the sum total of Te and Cr atoms present in said recording layer, is 0.1–60 atom %, and the proportion, based on the sum total of Te, Cr and C atoms present in said recording layer, of C is 0.1–40 atom %. According to the optical recording media as disclosed above, the recording layer improves in oxidation resistance and long duration of life of the optical recording media can be expected, because the recording layer comprising Te, Cr, C and H. In this connection, the distribution of C contained in the recording layer is not always uniform, and C may be distributed in the recording layer so that the content of C becomes smaller in the direction receding from the substrate side.

9 Claims, 2 Drawing Sheets

OPTICAL RECORDING MEDIA AND PROCESS FOR PREPARING SAME

This is a continuation-in-part of application Ser. No. 07/340,085 filed Apr. 18, 1989, now abandoned.

FIELD OF THE INVENTION

This invention relates to optical recording media of the type wherein bits corresponding to given pieces of information are formed on a recording layer provided on a substrate by irradiation with beam of energy such as light or heat, and to processes for preparing said optical recording media.

BACKGROUND OF THE INVENTION

There are two types of optical recording media, one of which is to form physically deformed portions such as holes or concavities at a certain place of a recording layer by irradiation with beam of energy, and the other of which is to form portions having been changed in optical properties such as refractive index and reflactance at a certain place of a recording layer by irradiation with beam of energy.

Recording layers consisting essentially of low melting metal such as tellurium (Te) have heretofore been known as those used in either of the two types of the optical recording media (Japanese Patent L-O-P Publns. Nos. 71196/1983 and 9234/1983). Te coating, typical of low melting metallic coatings, is capable of forming thereon desired physically deformed portions or portions having been changed in optical properties (hereinafter generically called "bits") by using a very low energy, and thus is very useful as a high sensitivity material. By sensitivity as used herein and hereinafter is meant that which is defined by energy (mw/cm$^2$) required for forming bits per unit surface area.

However, Te is oxidized with oxygen or moisture when allowed to stand in contact with the atmosphere, whereby it increases in transmittance and becomes transparent. Because of its thin coating as thin as about several hundreds Å, the recording layer formed by using Te alone markedly decreases in sensitivity when it increases in transmittance by oxidation of Te contained in such a thin recording layer. That is, when the recording layer composed of Te alone is oxidized, it increases in melt temperature and evaporation temperature and, at the same time, it becomes small in absorption of energy such as light as it becomes transparent, with the result that a large energy is required for forming bits and thus the recording layer markedly decreases in sensitivity. For instance, when Te coating formed on a substrate is allowed to stand in the circumstances of 70° C. and 85% RH, its sensitivity decreases by about 20% in about 5 hours, and by about 50% in about 25 hours.

With the view of solving such problems as mentioned above, there are taken various measures to prevent oxidation of Te coating. It is known as one of these measures that Te coating is coated on the surface with a stable inorganic substance. Though this measure is effective in preventing Te coating from its being oxidized, it has not been put to practical use, because the use of the stable inorganic substance to be coated on Te coating results in decrease of sensitivity of the Te coating and is also expensive. On one hand, it is also known to coat Te coating on the surface with plastics, but this measure is of little real use in preventing the Te coating from its being oxidized, because the plastics permit oxygen or moisture to permeate therethrough with relative ease, though the plastics are advantageous in that because of their low thermal conductivity, they are low in degree of marring the sensitivity of the Te coating.

Further, proposed is a technique intended to prevent Te coating as a recording layer from its being oxidized by virtue of incorporation into the Te coating of C and H (Japanese Patent Publn. No. 33320/1984).

This proposed technique possesses such tendency that oxidation resistance of the recording layer is insufficient yet when the content of C is decreased, and that C/N at the time of reading the recorded information decreases when the content of C is increased in order to improve oxidation resistance.

With the view of solving such problems as referred to above, Japanese Patent L-O-P Publn. No. 63038/1984 discloses optical recording media having recording layers consisting essentially of Te and additionally containing Cr. As stated in this publication, it has been known that when Cr is contained in a recording layer consisting essentially of Te, oxidation resistance of the resulting recording layer is improved in proportion to the content of Cr in said recording layer, and thus duration of life of the optical recording medium having such recording layer as mentioned above may be prolonged.

Optical recording media having recording layers consisting essentially of Te and additionally containing Cr as disclosed in the above-cited publication, however, possess such a drawback that the recording sensitivity decreases when large amounts of Cr are contained in the recording layers. On that account, it has been a common practice from the standpoint of improvement in oxidation resistance and in recording sensitivity that the content of Cr to be contained in a recording layer consisting essentially of Te is decided so as to amount of 5-15% by weight based on the Te present in the recording layer, as indicated in the above-cited Japanese Patent L-O-P Publn. No. 63038/1984.

However, the present inventors have found the fact that optical recording media having Te recording layers containing 5-15% by weight, based on the Te, of Cr are still low in recording sensitivity in comparison with an optical recording medium having a recording layer consisting Te alone. As a result of extensive researches conducted by the present inventors on such optical recording media as having recording layers consisting essentially of Te and additionally containing Cr, it has now been found that in optical recording media having recording layers consisting essentially of Te and additionally containing a specific amount of Cr along with C and H, oxidation resistance is increased, nevertheless recording sensitivity markedly improves in comparison with optical recording media having Te recording layers containing large amounts of Cr and, at the same time, recording margin is enlarged. The present inventors have also found that when optical recording media having on the substrate thereof recording layers consisting essentially of Te and additionally containing Cr, C and H are subjected to heat treatment, their recording sensitivity is further improved and, moreover, their recording margin is enlarged.

OBJECT OF THE INVENTION

The present invention has been accomplished on the basis of such a new technical information as gained above, and an object of the invention is to provide optical recording media in which oxidation resistance of their recording layers is improved, in particular, under the circumstances of high temperature and humidity, duration of life of said optical recording media is prolonged and, at the same time, information can be recorded by using a small energy and, moreover, recording sensitivity is high and recording margin is broad, and to provide processes for preparing the above mentioned optical recording media.

SUMMARY OF THE INVENTION

In order to accomplish the above-mentioned object, the optical recording media of the present invention comprise a substrate and a recording layer formed thereon, wherein information is recorded by forming bits corresponding to the information by irradiation with beam of energy.

The recording layer mentioned above comprises Te, Cr, C, and H, wherein the proportion, based on the sum total of atoms constituting the recording layer, of Cr is 0.1-40 atom %, and that of C is 0.1-40 atom %.

In another aspect, the optical recording media of the invention comprise likewise a substrate and a recording layer formed thereon, wherein the recording layer comprises Te, Cr, C and H. The proportion, based on the sum total of Te and Gr atoms present in the recording layer, of Cr is 0.1-60 atom %, and the proportion, based on the sum total of Te, Cr and C atoms present in the recording layer, of C is 1-40 atom %.

According to the present invention, because the recording layer of the optical recording media is so designed that it comprises Te, Cr, C and H, the recording layer improves in oxidation resistance and the optical recording media are prolonged in duration of life. This recording layer can markedly improved in oxidation resistance, in particular, under the circumstances of high temperature and humidity when the content of C, based on the sum total of Te, Cr and C atoms present in the recording layer, is adjusted to amount to 0.1-40 atom %. In the present invention, moreover, when the content of Cr in the recording layer is set at a value lower than that of the conventional Te recording layers containing Cr, for example, said content of Cr is set to 0.1-40 atom %, particularly 0.5-10 atom % based on the sum total of atoms present in the recording layer or the content of Cr is set to 0.1-60 atom % particularly 0.5-10 atom % based on the sum total of Te and Cr atoms present in the recording layer, the recording layer of the invention thus designed comes to have excellent recording sensitivity in comparison with the conventional Te recording layers containing large amounts of Cr.

Furthermore, such tendency that recording margin becomes narrower and C/N decreases with increasing content of C in the recording layer can effectively be inhibited when the content of C, based on the sum total of atoms present in the recording layer or the sum total of Te, Cr and C atoms present in the recording layer, is reduced to less than 5 atom %.

In the present invention, the distribution of C contained in the recording layer is not always uniform, but C may be distributed in such a manner that the content of C becomes smaller in the direction receding from the substrate.

In order to accomplish the aforementioned object of the invention, the processes for preparing optical recording media comprise forming the above-mentioned recording layers on the substrate and then subjecting the thus formed recording layers to heat treatment.

The heat treatment mentioned above is preferably carried out at a temperature of 70°-300° C. for at least 5 seconds, preferably 5 seconds-10 hours, more preferably 5 minutes-2 hours.

According to the processes for preparing optical recording media of the present invention, the recording layers as formed on the substrate are subjected to heat treatment, and hence the bits formed on the recording layers are found to be uniform in shape even when the recording energy output changed minutely, the recording margin enlarges and, at the same time, C/N improves and, moreover, the optical recording media obtained thereby improve in recording sensitivity.

Further, "recording margin is narrow" means that the range of recording energy output is narrow in order to obtain C/N more than predetermined value at the time of reading (the meaning shall apply hereinafter). In another words, it means that C/N changes according to variation of the recording energy output. Furthermore, C/N is used as an index to the extent of harsh noises produced at the time of reading the recorded information, and the higher is a value of 0/N, the lesser is the noise.

DETAILED DESCRIPTION OF THE INVENTION

The present invention is illustrated below in detail with reference to embodiments shown in the accompanying drawings.

Figure 1:
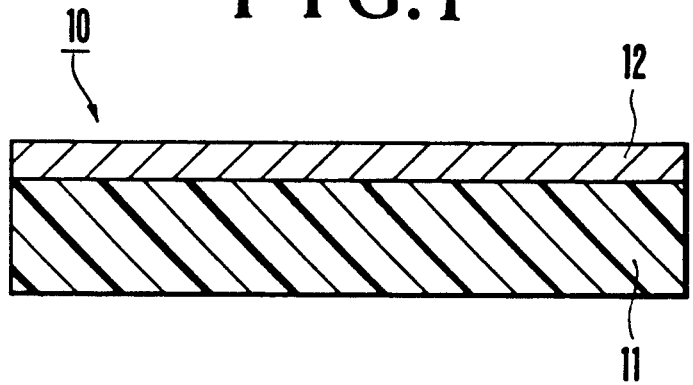
FIG. 1 is a rough sectional view of one embodiment of the optical recording media of the present invention.

As shown in FIG. 1, an optical recording medium 10 is composed of a substrate 11 and a recording layer 12 formed thereon.

Materials used for preparing the substrate 11 may be inorganic materials such as glass or aluminum and may be organic materials such as polymethyl methacrylate, polycarbonate, polymer alloy of polycarbonate with polystyrene, amorphous polyolefins as disclosed in U.S. Pat. No. 4,614,778, poly-4-methyl-1-pentene, epoxy resins, polyether sulfone, polysulfone, polyether imide, ethylene/tetracyclodecene copolymers and the like. A thickness of the substrate 11 may be such as sufficient to impart an appropriate rigidity to the substrate, for example, preferably 0.5-2.5 mm, more preferably 1-1.5 mm.

The recording layer 12 contains Te as a main component and additionally containing at least Cr, C and H, and this recording layer may contain low melting elements other than Te or other components. Elements other than Te which can be incorporated into the recording layer 12 may include, for example, Ti, Mn, Ni, Zr, Nb, Ta, Al, Pt, Sm, Bi, In, Se, Pb, Co, Si, Pd, Sn, Zn and the like.

The proportion of Cr contained in the recording layer 12 is, based on the total atoms contained in the recording layer, 0.1-40 atom %, preferably 0.5-10 atom % and more preferably 1-4 atom %, or is 0.1-60 atom %, preferably 0.5-15 atom % and more preferably 1-6 atom % based on the sum total of Te and Cr atoms present in the recording layer. This is because, the recording layer 12 does not decrease in recording sensitivity, nevertheless the recording layer 12 is improved in oxidation resistance and, according to certain circumstances, the recording sensitivity can be increased, by virtue of the incorporation of Cr in the above-mentioned ranges.

From the standpoint of improvement of the recording layer in duration of life and recording sensitivity, it is desirable that the content of C in the recording layer 12 is 0.1–40 atom %, preferably 5–40 atom % and, in particular, from the viewpoint of improvement of oxidation resistance, preferably 5–20 atom %, more preferably 5–10 atom % based on the total atoms present in the recording layer, or 5–40 atom %, preferably 5–20 atom % and more preferably 5–10 atom % based on the sum total of Te, Cr and C atoms present in the recording layer. By the incorporation into the recording layer 12 of C in the above-mentioned ranges, it becomes possible to improve the oxidation resistance, in particular, under the circumstances of high temperature and humidity without decreasing the recording sensitivity and recording margin so much. From the standpoint of improving the recording sensitivity and recording margin without decreasing the oxidation resistance so much, it is desirable that the content of C in the recording layer 12 is 0.1–5 atom %, preferably 3–5 atom % based on the total atoms present in the recording layer, or 0.1–5 atom %, preferably 3–5 atom % based on the sum total of Te, Cr and C atoms present in the recording layer. By incorporating C in the above-mentioned ranges into the recording layer 12, it becomes possible to improve the recording sensitivity and recording margin of the recording layer.

In another embodiment of the present invention, the content of C in the recording layer is so designed as to become smaller in the direction receding from the surface of the substrate. That is, the content of C in the recording layer on the substrate side is made larger than the content of C in the vicinity of the outer surface of the recording layer, either consecutively or stagewise, for example, by forming C into a multilayered film comprising two or more layers. In the extreme case, the content of C in the vicinity of the outer surface of the recording layer may be zero.

The content of H in the recording layer 12 is desirably 5–40 atom %, preferably 5–25 atom % based on the total atoms present in the recording layer, from the standpoint of improvements in duration of life and the like. The amounts of elements contained in the recording layer 12 are determined by the following manner: metallic elements (Te, Cr, etc.) by ICP emission spectroscopic analysis, C by K-ray photoelectron spectroscopy (XPS), (ESCA) and H by organic element analysis.

In recording information in the recording layer 12 having such composition as mentioned above, the desired recording of given pieces of information may be accomplished by irradiating the recording layer with beam of energy such as laser beam modulated according to the pieces of information to be recorded and forming the corresponding bits on the irradiated portions of the recording layer. The bits may be those physically modified such as holes or concavities, or may be such portions of the recording layer in which optical properties such as refractive index and reflactance have been changed by the irradiation.

The recording layer 12 as mentioned above must be large in thickness to such an extent that sufficient light reflactance is obtained thereby and, at the same time, it must be small in thickness to such an extent that no sensitivity is marred thereby. To be concrete, when physically deformed portions such as holes are formed in the recording layer 12, a film thickness of the recording layer is from about preferably 100 Å–1 $\mu$m, more preferably about 100–5000 Å and most preferably about 150–500 Å. When portions in which optical properties have been changed are formed in the recording layer 12, a film thickness of the recording layer is preferably about 100 Å–1 $\mu$m, more preferably about 100–5000 Å and most preferably about 200–2000 Å.

The recording layer 12 may be formed on the substrate 11 in the following manner.

First, Te and Cr individually used as separate targets or Te-Cr alloy used as a target is subjected to magnetron sputtering in a mixed gas comprising an organic gas containing C and H, for example, $CH_4$ or $C_2H_2$ gas, and Ar gas, whereby the recording layer 12 composed of a Te-Cr alloy film containing C and H is deposited on the substrate 11. It is also possible, without using the sputtering process, to form the recording layer 12 composed of a Te-Cr alloy film containing C and H on the substrating by using $CH_4$ gas and vapor of Te-Cr alloy in the plasma form. Further, the recording layer 12 can also be formed by vapor phase growth or plasma vapor phase growth. Furthermore, as another alternative, a part of all of Te, Cr, C and H atoms may be ionized to a beam-like state and allowed to accumulate on the substrate.

The proportions of Te and Cr atoms contained in the thus formed recording layer 12 composed of a Te-Cr alloy film containing C and H may be freely controlled by voltages respectively applied to Te and Cr when they are individually subjected to sputtering simultaneously, and by composition of a Te-Cr alloy when Te and Cr are used as an alloy target. The amounts of C and H contained in this recording layer 12 may freely be controlled by the mixing ratio of $CH_4$ and Ar and electric power applied. In this case, the amount of H through which the Te-Cr alloy film is best stabilized depends on the amount of C contained therein. In the present invention, the amount of H contained in this alloy film may be optionally selected if said amount is not so large that hydrogen gas ($H_2$) is evolved in said film. A film thickness of the recording layer 12 may freely controlled, because the film thickness is proportional to the sputtering time.

Furthermore, the recording layer 12 which is so designed that the content of C in the recording layer will become smaller at portions of said layer in the direction receding from the substrate surface may be formed on the substrate by lowering a concentration in the film forming atmosphere of hydrocarbon gas at the latter stage of film forming operation than the concentration of the hydrocarbon gas used at the outset of the film forming operation. The concentration of the hydrocarbon may be lowered consecutively or stagewise.

In the thus formed recording layer 12 composed of the Te-Cr alloy film containing C and H, optical properties such as complex refractive index and attenuation coefficient may vary by the contents of C and H, and when this recording layer is used for information recording purposes, a film thickness of said layer is decided according to such optical properties as required for the purpose intended.

The hydrocarbon introduced into a thin layer forming apparatus at the time when the recording layer is formed includes methane, ethane, acetylene, etc. Usually, the hydrocarbon is introduced, together with an inert gas, into the thin layer forming apparatus. The inert gas in that case includes helium, neon, argon, krypton, nitrogen, etc., and among these inert gases, argon is particularly preferred.

The recording layer 12 formed under such conditions as mentioned above is amorphous, and is improved markedly in oxidation resistance and recording sensitivity in comparison with recording layers formed from low melting metals alone such as Te.

For instance, it has been confirmed by experiments that in a Te recording layer containing Cr, C and H, a change in reflectivity, after the lapse of 100 hours under the circumstances of 70°C. and 85% RH, becomes smaller with increasing amount of Cr contained in the layer, and that the recording layers of the present invention are improved in oxidation resistance, as compared with recording layers composed of Te alone.

It has also been proved experimentally that in the recording layers of the present invention, recording energy output required is relatively small and recording sensitivity is improved.

Figure 2:
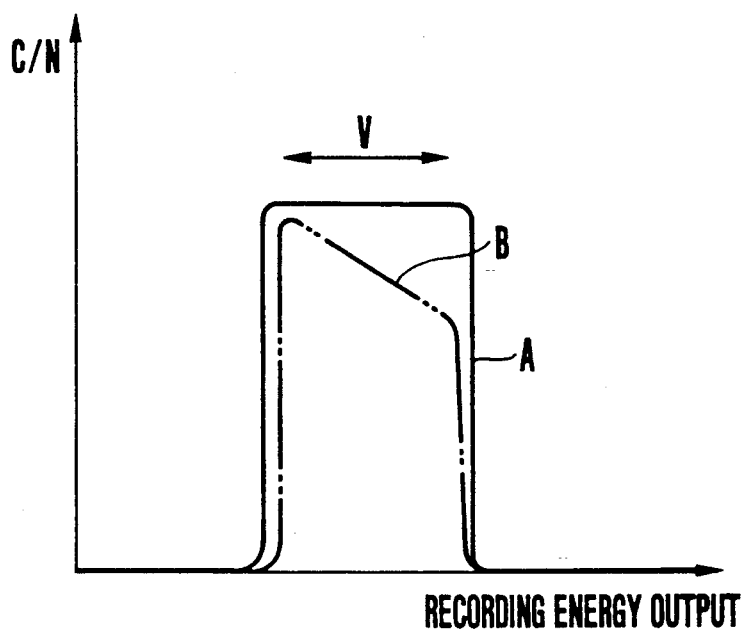
FIGS. 2 and 3 are graphs each showing a difference in function and effect between the optical recording media of the present invention and those of the prior art.
Figure 3:
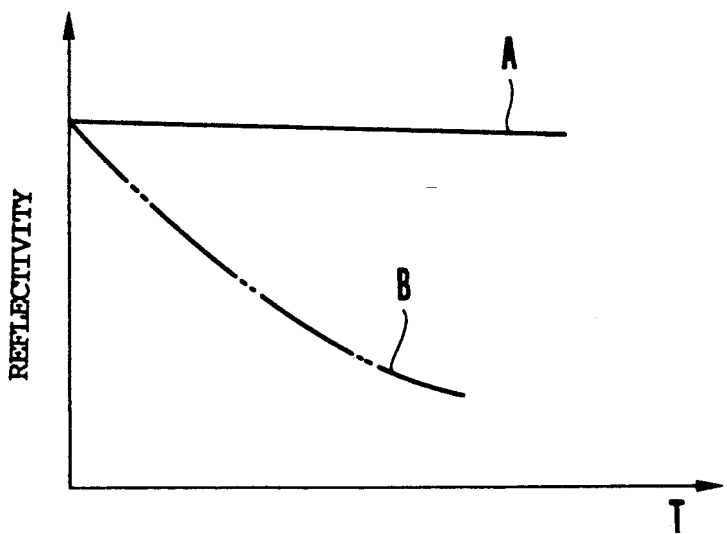

As shown in FIG. 2, moreover, it has been confirmed that when compared with a conventional optical recording medium having a Te recording layer containing C and H (curve B shown in the figure), the recording medium of the present invention (curve A shown in the figure) shows practical no change in C/N with a microvariation V of recording energy output, and has a wider recording margin.

Furthermore, as shown in FIG. 8, it has also been confirmed that when compared with a conventional optical recording medium having a Te recording layer containing C and H (curve B shown in the figure), the optical recording medium of the present invention (curve A shown in the figure) shows no practical change in reflectivity on standing, and improves also in serviceablity.

In the present invention, after forming the recording layer 12 on the substrate 11 in the manner as mentioned above, if necessary, this recording layer 12 may be subjected to heat treatment in an inert gas, reducing gas or in an atmosphere of gas containing oxygen. The heat treatment temperature employed in that case must be lower than the melting point of Te contained in the recording layer, and is preferably 70°-300° C., especially 90°-150° C. The heat treatment time employed is preferably at least 5 seconds, more preferably 5 seconds-10 hours, most preferably 5 minutes-2 hours.

By virtue of the heat treatment of the recording layer 12 after formation of said layer on the substrate 11 in the manner now described, the recording sensitivity in said recording layer improves and, at the same time, the recording margin thereof enlarges.

The present invention is not limited to the embodiment shown in FIG. 1, but it should be construed that variations and modifications can be effected within the spirit and scope of the invention.

Figure 4:
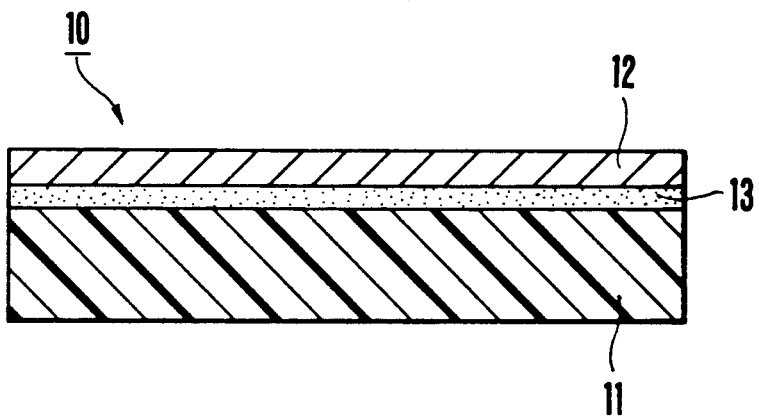
FIG. 4 is a rough sectional view of another embodiment of the optical recording media of the present invention.

For instance, as shown in FIG. 4, an undercoat layer 13 may be laminated between the substrate 11 and the recording layer 12. The undercoat layer 13 used in that case includes, for example, films of fluorides such as magnesium fluoride ($MgF_2$), films of silicon compounds such as silicon oxide ($SiO_2$, SiO) or silicon nitride ($Si_3N_4$), metallic films composed of Ti, Ni, Cr, Al or Ni-Cr, films of fluorine-substituted hydrocarbon compounds such as polytetrafluoroethylene (PTFE) film and/or polymer film thereof, and Cr-C-H film (film containing Cr, C and H). The undercoat layer 13 usually has a film thickness of preferably 10-1000 Å, more preferably 50-500 Å, though the film thickness may vary according to the material used for the undercoat layer. By virtue of the film thickness as set above, these undercoat layers exemplified above can maintain their transparency and, at the same time, can exhibit various characteristics as the undercoat layer 13.

The undercoat layer 13 may be formed on the surface of the substrate 11 in the same manner as in the case of the recording layer 12 by the magnetron sputtering, vapor phase growth, plasma vapor phase growth, vacuum evaporation or spincoat process.

When the undercoat layer 13 is provided between the substrate 11 and the recording layer 12, under certain circumstances, further enlarges the recording margin thereof, too.

According to the present invention, a surface layer may be formed on the surface of the recording layer 12 of the optical recording medium 10 shown in FIG. 1 and FIG. 4. The material used for forming the surface layer includes elements for the recording layer, oxides of Si, Ti and the like, nitrides and metals. The surface layer has a film thickness of preferably 5-100 Å, more preferably 10-50 Å, though the film thickness may vary according to the material used for forming the same.

The present invention is illustrated below in more detail with reference to concrete examples, but it should be construed that the invention is in no way limited to those examples.

EXAMPLE 1

After evacuating a vacuum receptacle, Ar gas and $CH_4$ gas were introduced into the receptacle, and an internal pressure in the receptacle was set at $6 \times 10^{-3}$ Torr ($Ar/CH_4 = 2/8$: gas flow ratio). Subsequently, in the receptacle, Te and Cr individually used as targets were sputtered simultaneously, while controlling the voltage applied to each target and the sputtering time, whereby a layer composed of $Te_{53}Cr_2C_{15}H_{30}$ having a film thickness of 250 Å was obtained on a substrate of amorphous polyolefin.

EXAMPLE 2

The procedure of Example 1 was repeated with the exception of using the gas flow ratio of $Ar/CH_4 = 8/2$ to obtain a recording layer composed of $Te_{80}Cr_3C_6H_{11}$ and having a film thickness of 240 Å on a substrate of amorphous polyolefin.

EXAMPLE 3

The procedure of Example 1 was repeated with the exception of the gas flow ratio of $Ar/CH_4 = 8/2$ to obtain a recording layer composed of $Te_{82}Cr_1C_6H_{11}$ and having film thickness of 220 Å on a substrate of amorphous polyolefin.

COMPARATIVE EXAMPLE 1

The procedure of Example 1 was repeated with the exception of the gas flow ratio of $Ar/CH_4 = 9/1$ and a target of Te to obtain a recording layer composed of $Te_{89}C_4H_7$ and having film thickness of 250 Å on a substrate of amorphous polyolefin.

REFERENTIAL EXAMPLE 1

The procedure of Example 1 was repeated with the exception of using only Ar gas as a gas to be introduced into the receptacle to obtain a recording layer composed of $Te_{97}Cr_3$ and having a film thickness of 250 Å on a substrate of amorphous polyolefin.

EXAMPLES 4-6

The recording layers (recording mediums) obtained in Examples 1-3, respectively, were subjected individually to heat treatment at a temperature of 100° C. in $N_2$ atmosphere for 20 minutes.

EXAMPLE 7

After evacuating a vacuum receptacle, Ar gas and $CH_4$ gas were into the receptacle, and an internal pressure in the receptacle was set at $6 \times 10^{-3}$ Torr (Ar/CH=9/1: gas flow ratio). Subsequently, in the receptacle, Te and Cr used as targets were sputtered simultaneously, while controlling the voltage applied to each target and the sputtering time, whereby a layer composed of $Te_{87}Cr_2C_4H_7$ having a film thickness of 240 Å was obtained on a substrate of amorphous polyolefin.

EXAMPLE 8

The procedure of Example 7 was repeated with the exception of setting the film thickness to 290 Å to obtain a recording layer composed $Te_{87}Cr_2C_4H_7$ on a substrate of amorphous polyolefin.

EXAMPLES 9-10

The recording layers (recording mediums) obtained in Examples 7-8, respectively, were subjected to individually to heat treatment at a temperature of 100 C in $N_2$ atmosphere for 20 minutes.

EXAMPLE 11

The procedure of Example 7 was repeated with the exception of using a $Te_{97}Cr_3$ alloy target and setting the gas flow ratio to $Ar/Ch_4=9/1$ to obtain a recording layer composed of $Te_{87}Cr_2C_4H_7$ and having a film thickness of 230 Å on a substrate of amorphous polyolefin. Subsequently, the recording layer (recording medium) obtained was subjected to heat treatment in the same manner as in Examples 9-10.

EXAMPLE 12

After evacuating a vacuum receptacle, Ar gas and $CH_4$ gas were introduced into the receptacle and an internal pressure in the receptacle was set to $6 \times 10^{-3}$ Torr ($Ar/CH_4=9/1$: gas flow ratio). Subsequently, Te and Cr used as targets were sputtered simultaneously in the receptacle, while controlling the voltage applied to each target and the sputtering time, to obtain recording layer having a film thickness of 240 Å and containing Te, Cr, C and H on a substrate of amorphous polyolefin, the atomic ratio of Te, Cr and C in said recording layer being represented by the formula $(Te_{98.8}Cr_{1.2})_{96}C_4$.

EXAMPLE 13

The procedure of Example 12 was repeated with the exception of setting the film thickness to 290 Å to obtain a recording layer containing Te, Cr, C and H, the proportions of Te, Cr and C atoms in said recording layer being represented by the formula $(Te_{98}Cr_2)_{96}C_4$ on a substrate of amorphous polyolefin.

EXAMPLE 14

The procedure of Example 12 was repeated with the exception of setting the film thickness of 260 Å to obtain a recording layer containing Te, Cr, C and H, the atomic ratio of Te, Cr and C in said recording layer being represented by the formula $(Te_{96.8}Cr_{8.2})_{96}C_4$ on a substrate of amorphous polyolefin.

EXAMPLE 15

The procedure of Example 12 was repeated with the exception of setting the film thickness to 230 Å to obtain a recording layer containing Te, Cr, C and H, the atomic ratio of Te, Cr and C in said recording layer being represented by the formula $(Te_{92}Cr_8)_{98}C_2$ on a substrate of amorphous polyolefin.

EXAMPLE 16

The procedure of Example 12 was repeated with the exception of using a $Te_{97}Cr_3$ alloy target and setting the film thickness to 230 Å to obtain a recording layer containing Te, Cr, C and H, the atomic ratio of Te, Cr and C in said recording layer being represented by the formula $(Te_{97.5}Cr_{2.5})_{96}Cr_4$ on a substrate of amorphous polyolefin.

EXAMPLE 17

The procedure of Example 12 was repeated with the exception of using a $Te_{94}Cr_6$ alloy target and setting the film thickness to 250 Å to obtain a recording layer containing Te, Cr, C and H, the atomic ratio of Te, Cr and C in said recording layer being represented by the formula $(Te_{95.1}Cr_{4.9})_{98}C_2$ on a substrate of amorphous polyolefin.

EXAMPLES 18-23

The recording layers (recording mediums) obtained in Examples 12-17, respectively, were subjected individually to heat treatment at a temperature of 100° C. in $N_2$ atmosphere for 20 minutes.

EXAMPLE 24

After evacuating a vacuum receptacle, Ar gas and $CH_4$ gas were introduced into the receptacle, and an internal pressure in the receptacle was set to $6 \times 10^{-8}$ Torr ($Ar/CH_4=2/8$: gas flow ratio). Subsequently, Te and Cr used as targets in the receptacle were sputtered simultaneously, while controlling the voltage applied to each target, to form a layer containing $Te_{53}Cr_2C_{15}H_{30}$ to a thickness of 60 Å on an amorphous polyolefin substrate. Successively, the same procedure as above was repeated but setting the gas flow ratio into $Ar/CH_4=8/2$ to form on the above-mentioned layer a second layer containing $Te_{81}Cr_2C_6H_{11}$. Thus, a recording layer composed of two layers obtained above and having a total film thickness of 260 Å was obtained.

EXAMPLE 25

The procedure of Example 24 was repeated to form a layer containing $Te_{53}Cr_2C_{15}H_{30}$ and having a film thickness of 100 Å on a substrate of amorphous polyolefin. Subsequently, on this layer a second layer containing $Te_3Cr_2C_{15}H_{30}$ was formed to obtain a recording layer composed of two layers obtained above and having a total film thickness of 260 Å.

EXAMPLE 26

The procedure of Example 24 was repeated to form a layer containing $Te_{53}Cr_2C_{15}H_{30}$ to a thickness of 100 A on a substrate of amorphous polyolefin. Subsequently, on this layer was formed a layer containing $Te_{87}Cr_2C_4H_7$ in the same procedure as above but setting the gas flow ratio to $Ar/CH_4=9/1$. Thus, a Te-Cr-C-H recording layer having a total film thickness of 320 Å was obtained.

EXAMPLE 27

The procedure of Example 24 was repeated to form a layer containing $Te_{53}Cr_2C_{15}H_{30}$ to a thickness of 100 Å on a substrate of amorphous polyolefin. Subsequently, on this layer was formed in the same procedure as above but using only Ar gas a second layer containing $Te_{96}Cr_4$. Thus, a recording layer composed of two layers obtained above and having a total film thickness of 250 Å was obtained.

EXAMPLE 28

The recording layer (recording medium) obtained in Example 27 was subjected to heat treatment at a temperature of 100° C. for 20 minutes.

COMPARATIVE EXAMPLE 2

A recording layer containing $Te_{87}C_4H_7$ and having a film thickness of 250 Å was obtained by setting a gas flow ratio to $Ar/CH_4 = 9/1$ and using a Te target.

EXAMPLE 29

After evacuating a vacuum receptacle, Ar gas was introduced into the receptacle, and an internal pressure in the receptacle was set to $6 \times 10^{-3}$ Torr. In the receptacle, polytetrafluoroethylene used as a target was sputtered to form an undercoat layer having a film thickness of about 300 Å on a substrate of amorphous polyolefin. Subsequently, Ar gas and $CH_4$ gas were introduced into said receptacle, and a $Te_{97}Cr_3$ alloy used as a target was sputtered therein, while controlling the voltage applied to the target and the sputtering time, to obtain a recording layer containing $Te_{87}Cr_2C_4H_7$ and having a film thickness of 200 Å.

EXAMPLE 30

The procedure of Example 29 was repeated with the exception of using $SiO_2$ as a sputtering target for forming the undercoat layer on a substrate of amorphous polyolefin, setting the film thickness of the undercoat layer to about 250 Å and setting the film thickness of the recording to be formed on said undercoat layer to about 240 ÅA, whereby a recording layer was obtained on the undercoat layer.

EXAMPLE 31

The procedure of Example 29 was repeated with the exception of using Ti as a sputtering target for forming the undercoat layer on a substrate of amorphous polyolefin, setting the film thickness of the undercoat layer to about 100 Å, and setting the film thickness of the recording layer to be formed on said undercoat layer to about 240 Å, whereby a recording layer was obtained on the undercoat layer.

EXAMPLE 32

The procedure of Example 29 was repeated with the exception of using $Si_3N_4$ as a sputtering target for forming the undercoat layer on a substrate of amorphous polyolefin, setting the film thickness of the undercoat layer to about 500 Å, and setting the film thickness of the recording layer to be formed on said undercoat layer to about 240 Å, whereby a recording layer was obtained on the undercoat layer.

EXAMPLE 33

The procedure of Example 29 was repeated with the exception of using $MgF_2$ as a sputtering target for forming the undercoat layer on a substrate of amorphous polyolefin, setting the film thickness of the undercoat layer to about 200 Å, and setting the film thickness of the recording layer to be formed on said undercoat layer to about 240 Å, whereby a recording layer was obtained on the undercoat layer.

EXAMPLE 34

After evacuating a vacuum receptacle, Ar gas and $CH_4$ gas were introduced into he receptacle, and an internal pressure in the receptacle was set to $6 \times 10^{-3}$ Torr ($Ar/CH_4 = 5/5$: gas flow ratio). In the receptacle, Cr used as a target was sputtered to form an undercoat layer composed of a Cr-C-H layer and having a film thickness of about 50 Å on a substrate of amorphous polyolefin. Subsequently, Ar gas and $CH_4$ gas were introduced into the receptacle, and the same procedure as in Example 29 was repeated to obtain a recording layer containing $Te_{87}Cr_2C_4H_7$ and having a film thickness of about 230 Å on the undercoat layer.

EXAMPLE 35

The procedure of Example 34 was repeated with the exception of setting the film thickness of the Cr-C-H layer to about 130 Å, to form a recording layer on the undercoat layer.

EXAMPLE 36

The recording layer (recording medium) obtained in Example 35 was subjected to heat treatment at a temperature of 100° C. in $N_2$ atmosphere for 20 minutes.

Experimental results (1) A disc of optical recording medium was rotated at a rate of 1800 rpm and irradiated with laser beam at a frequency of 3.7 MHz to examine recording characteristics. C/N max as used herein is intended to show a maximum value of C/N when a laser power is changed. The recording sensitivity is intended to show a minimum value of the laser power when C/N max $\times$ 0.9 < C/N is attained, and the margin is intended to show the range of the laser power when C/N max $\times$ 0.9 < C/N is attained.

The results obtained in Examples 1–6, respectively, are shown in Table 1. The results obtained in Examples 7–23, respectively, are shown in Table 3. The results obtained in Examples 24–28, respectively, are shown in Table 5. Example 29–36, respectively, are shown in Table 7.

(2) Reflectivity R measured after the lapse of 500 hours allowing a disc of optical recording medium under the circumstances of 70° C. and 85% RH was compared with the initial reflectivity $R_0$ to examine percentage variation in refractive index.

The results obtained in Example 6 are shown in Table 2. The results obtained in Examples 9 and 18 are shown in Table 4. The results obtained in Examples 24 and 28 are shown in Table 6. The result obtained in Example 36 is shown in Table 8.

TABLE 1

|  | C/N max (dB) | Recording sensitivity (mW) | Margin (mW) |
| --- | --- | --- | --- |
| Example 1 | 48 | 6.5 | 2.8 |

TABLE 1-continued

| | C/N max (dB) | Recording sensitivity (mW) | Margin (mW) |
|---|---|---|---|
| 2 | 49 | 5.0 | 2.0 |
| 3 | 51 | 6.3 | 0.7 |
| 4 | 49 | 6.0 | 3.2 |
| 5 | 53 | 5.9 | 1.2 |
| 6 | 53 | 6.0 | 1.0 |
| Comparative Example 1 | 53.5 | 6.3 | 0.3 |
| Referential Example 1 | 52 | 6.5 | 1.0 |

TABLE 2

| | Percentage variation in reflectivity $(R_0 - R) \times 100/R_0$ |
|---|---|
| Example 6 | 10% |
| Comparative Example 1 | 16% |
| Referential Example 1 | 12% |

TABLE 3

| | C/N max (dB) | Recording sensitivity (mW) | Margin (mW) |
|---|---|---|---|
| Example 7 | 50 | 6.3 | 0.8 |
| 8 | 51 | 7.0 | 0.5 |
| 9 | 55.5 | 5.8 | 2.2 |
| 10 | 56 | 6.6 | 1.4 |
| 11 | 55.5 | 5.9 | 2.1 |
| 12 | 51 | 6.5 | 0.5 |
| 13 | 51 | 7.0 | 0.5 |
| 14 | 52.5 | 6.4 | 0.6 |
| 15 | 54 | 6.0 | 2.0 |
| 16 | 53.5 | 6.1 | 1.3 |
| 17 | 53 | 6.6 | 0.9 |
| 18 | 55.5 | 5.8 | 2.2 |
| 19 | 56 | 6.6 | 1.4 |
| 20 | 55 | 6.4 | 2.1 |
| 21 | 49 | 6.6 | 2.7 |
| 22 | 55.5 | 5.9 | 2.6 |
| 23 | 52.5 | 6.7 | 1.9 |
| Comparative Example 1 | 53.5 | 6.3 | 0.3 |
| Referential Example 1 | 52 | 6.5 | 1.0 |

TABLE 4

| | Percentage variation in reflectivity $(R_0 - R) \times 100/R_0$ |
|---|---|
| Example 9 | 2% |
| 18 | 2% |
| Comparative Example 1 | 16% |
| Referential Example 1 | 12% |

TABLE 5

| | C/N max (dB) | Recording sensitivity (mW) | Margin (mW) |
|---|---|---|---|
| Example 24 | 52 | 5.8 | 1.7 |
| 25 | 52 | 5.3 | 1.6 |
| 26 | 50.5 | 5.4 | 1.5 |
| 27 | 53 | 5.9 | 0.2 |
| 28 | 50.5 | 5.8 | 2.2 |
| Comparative Example 2 | 53.5 | 6.3 | 0.3 |
| Referential Example 1 | 52 | 6.5 | 1.0 |

TABLE 6

| | Percentage variation in reflectivity $(R_0 - R) \times 100/R_0$ |
|---|---|
| Example 24 | 3% |
| 28 | 5% |
| Comparative Example 2 | 16% |
| Referential Example 1 | 12% |

TABLE 7

| | C/N max (dB) | Recording sensitivity (mW) | Margin (mW) |
|---|---|---|---|
| Example 29 | 45.5 | 4.8 | 1.4 |
| 30 | 49 | 4.4 | 2.0 |
| 31 | 50 | 5.0 | 3.0 |
| 32 | 50 | 6.0 | 2.1 |
| 33 | 47 | 6.0 | 1.2 |
| 34 | 51 | 4.8 | 1.4 |
| 35 | 47 | 4.7 | 1.5 |
| 36 | 56 | 5.9 | 3.5 |
| Comparative Example 1 | 53.5 | 6.3 | 0.3 |

TABLE 8

| | Percentage variation in reflectivity $(R_0 - R) \times 100/R_0$ |
|---|---|
| Example 36 | 4% |
| Comparative Example 1 | 16% |

What is claimed is:

1. An optical recording medium comprising a substrate and a recording layer formed thereon, capable of being irradiated with a beam of energy to form thereon bits corresponding to given pieces of information and thereby record the pieces of information, said recording layer consisting essentially of Te, Cr, C and H, wherein the proportion, based on all atoms constituting said recording layer, of Cr contained in the recording layer is 0.1–40 atom %, the proportion of C contained in the recording layer is 0.1–40 atom %, and the film thickness of the recording layer is about 100 Å to 1 μm.

2. An optical recording medium comprising a substrate and a recording layer formed thereon, capable of being irradiated with a beam of energy to form thereon bits corresponding to given pieces of information and thereby record the pieces of information, said recording layer consisting essentially of Te, Cr, C and H, wherein the proportion, based on the total of Te and Cr atoms present in said recording layer, of Cr contained in the recording layer is 0.1–60 atom %, the proportion, based on the total of Te, Cr and C atoms present in said recording layer, of C contained in the recording layer is 0.1–40 atom %, and the film thickness of the recording layer is about 100 Å to 1 μm.

3. An optical recording medium comprising a substrate and a recording layer formed thereon, capable of being irradiated with a beams of energy to form thereon bits corresponding to given pieces of information and thereby recording the pieces of information, said recording layer consisting essentially of Te, Cr, C and H, wherein the proportion, based on all atoms constituting said recording layer, of Cr is 0.1–40 atom %, the proportion of C contained in the recording layer is 5–40 atom %, and the film thickness of the recording layer is about 100 Å to 1 μm.

4. An optical recording medium comprising a substrate and a recording layer formed thereon, capable of being irradiated with a beam of energy to form thereon bits corresponding to given pieces of information and thereby record the pieces of information, said recording layer consisting essentially of Te, Cr, C and H, the proportion, based on the total of Te and Cr atoms present in said recording layer, of Cr contained in the recording layer is 0.1–60 atom %, the proportion, based on the total of Te, Cr and C atoms present in said recording layer, of C contained in the recording layer, is 5–40 atom %, and the film thickness of the recording layer is about 100 Å to 1 μm.

5. An optical recording medium comprising a substrate and a recording layer formed thereon, capable of being irradiated with a beam of energy to form thereon bits corresponding to given pieces of information and thereby recording the pieces of information, said recording layer consisting essentially of Te, Cr, C and H, and the proportion, based on all atoms constituting said recording layer, of Cr contained in said recording layer of 0.1–40 atom %, the proportion of C contained in the recording layer is 0.1–5 atom %, and the film thickness of the recording layer is about 100 Å to 1 μm.

6. An optical recording medium comprising a substrate and a recording layer formed thereon, capable of being irradiated with a beam of energy to form thereon bits corresponding to given pieces of information and thereby recording the pieces of information, said recording layer consisting essentially of Te, Cr, C and H, wherein the proportion, based on the total of Te and Cr atoms present in the recording layer contained in said recording layer, of Cr is 0.1–60 atom %, the proportion, based on the total of Te, Cr and C atoms present in the recording layer, of C contained in said recording layer is 0.1–atom %, and the film thickness of the recording layer is about 100 Å to 1 μm.

7. An optical recording medium comprising a substrate and a recording layer formed thereon, capable of being irradiated with a beam of energy to form thereon bits corresponding to given pieces of information and thereby record the pieces of information, said recording layer consisting essentially of Te, Cr, C and H, wherein the proportion, based on all atoms constituting the recording layer, of Cr contained in said recording layer is 0.1–40 atom %, the content of C contained in said recording layer decreasing in the direction receding from the surface of the substrate, and the film thickness of the recording layer is about 100 Å to 1 μm.

8. The optical recording medium as claimed in any one of claims 1–6 or 7 wherein an undercoat layer is laminated between the substrate and the recording layer.

9. The optical recording medium as claimed in claim 8 wherein the undercoat layer is at least one thin layer selected from among the group consisting of layers of fluorides, layers of silicone compounds, metallic layers, layers of fluorine-substituted hydrocarbon compounds, layers of fluorine-substituted hydrocarbon polymer compounds and Cr-C-H layers.

* * * * *